United States Patent [19]

Heinrich

[11] Patent Number: 5,464,694
[45] Date of Patent: Nov. 7, 1995

[54] SPINNABLE POLYESTER BASED ON MODIFIED POLYETHYLENE TEREPHTHALATE AND ALIPHATIC DICARBOXYLIC ACIDS

[75] Inventor: Bernd Heinrich, Friedberg, Germany

[73] Assignee: Hoechst Aktiengesellschaft, Germany

[21] Appl. No.: 116,134

[22] Filed: Sep. 2, 1993

[30] Foreign Application Priority Data

Sep. 5, 1992 [DE] Germany ............... 42 29 759.1

[51] Int. Cl.$^6$ ..................... B32B 19/00
[52] U.S. Cl. .......... 128/357; 428/365; 428/364; 528/287; 528/271; 260/DIG. 24
[58] Field of Search .............. 428/365, 357; 528/287; 260/45.7 P, 860, 75 P, 755, DIG. 24

[56] References Cited

U.S. PATENT DOCUMENTS

| | | | |
|---|---|---|---|
| Re. 30,554 | 3/1981 | Weinberg et al. | 260/429 R |
| Re. 30,783 | 10/1981 | Kleiner et al. | 528/287 |
| 3,941,752 | 3/1976 | Kleiner et al. | 260/75 P |
| 3,998,908 | 12/1976 | Buxbaum | 260/860 |
| 4,104,261 | 8/1978 | Magosch et al. | 260/873 |
| 4,143,057 | 3/1979 | Weinberg et al. | 260/429 R |
| 4,151,223 | 4/1979 | Neuberg et al. | 260/873 |
| 4,156,072 | 5/1979 | Weinberg et al. | 528/279 |

FOREIGN PATENT DOCUMENTS

| | | |
|---|---|---|
| 1435637 | 1/1969 | European Pat. Off. . |
| 2117659 | 10/1972 | European Pat. Off. . |

OTHER PUBLICATIONS

Chemical Abstracts, vol. 117, No. 26, Dec. 28, 1992 Abstract No. 25327s, &JP-A-4 194 024 (Toray Ind. Inc.) 14 Jul. 1992.

Database WPI Week 8948, Derwent Publications Ltd., London, GB; AN 89-353853 & JP A-1 266 220 (Mitsubishi Rayon KK) 24 Oct. 1989.

Patent Abstracts of Japan, vol. 12, No. 467 (C-550) Dec. 7, 1988 & JP A 63 190 015 (Asahi Chem. Ind. Co. Ltd.) 5 Aug. 1988.

Database WPI Week 9304, Derwent Publications Ltd., London, GB; AN 93-033023 & JP-A-4 361 610 (Toray Ind. Inc.) 15 Dec. 1992.

Database WPI Week 9027, Derwent Publications Ltd., London, GB; AN 90-206817 & JP A-1 139 409 (Teijin Ltd.) 29 May 1990.

Chemiefasern/Textilindustrie, Bd. 22/74, May 1972, Sieten 388-396 F. Jakob.

*Primary Examiner*—Patrick J. Ryan
*Assistant Examiner*—Merrick Dixon
*Attorney, Agent, or Firm*—Connolly & Hutz

[57] ABSTRACT

There are described a spinnable polyester for producing fully oriented polyester yarn by high speed spinning based on polyethylene terephthalate modified by incorporation of aliphatic dicarboxylic acids as cocondensed units and which may additionally contain up to 5% by weight of further additaments customary for modifying polyethylene terephthalate, wherein modifying aliphatic dicarboxylic acids present as cocondensed units have in total from 4 to 10 carbon atoms and are present in such an amount that the glass transition temperature of the polyester is 70° C. or below, the recrystallization temperature of the polyester is 180° C. or below and the heat of fusion of the polyester, determined by DSC measurement, is 30 J/g or below, a polyester yarn producible therefrom by high speed spinning, which has a novel combination of high strength, high modulus and enhanced shrinkage capacity, and a process for producing this yarn.

6 Claims, No Drawings

SPINNABLE POLYESTER BASED ON MODIFIED POLYETHYLENE TEREPHTHALATE AND ALIPHATIC DICARBOXYLIC ACIDS

DESCRIPTION

The present invention relates to a fully oriented, high strength polyester yarn produced by high speed spinning, which has an adequate shrinkage capacity for critical applications, to a process for producing this yarn, and to the polyester raw material required for said process.

In conventional fibermaking by melt spinning and separate drawing it is already known to obtain high shrinkage and also deeper dyeing polyester fibers by the addition of dicarboxylic acids or hydroxycarboxylic acids and diols; see for example the review, Polyesterfasern der zweiten Generation, in Chemiefasern/Textilindustrie 22/74 (1972), pp. 388 ff.

However, in spin-drawing against air friction these additaments generally lead to yarns of such low orientation that they are usable only for few textile purposes.

DE-A-21 17 659 discloses producing fully oriented polyester yarns by spin-drawing. In this known process, the fully oriented polyester yarn is produced by spinning a modified or unmodified polyester based on polyethylene terephthalate, solidifying the spun filaments by cooling, heating the solidified filaments to a temperature above the glass transition temperature, to from 100° to 150° C., withdrawing the filaments at such a high speed that air friction on the filaments brings about their full orientation, and taking up.

Yarns produced by this process have high dyeability, high strength and a steep force-elongation diagram, but like the highly drawn yarns they exhibit a relatively small shrinkage capacity, which generally is below 20 (cN/tex)%. Shrinkage capacity is defined as the product of the shrinkage force in cN/tex and the 200° C. hot air shrinkage (HAS$_{200}$) in %. This shrinkage capacity is too low for normal textile finishing processes. A higher shrinkage capacity is also urgently needed for the production of high strength textiles, for example for the production of motor vehicle seat covers, since shrinkage of the textile sheet leads to a very advantageous compaction of the structure.

It has now been found, surprisingly, that the process known from DE-A-21 17 659 can be used to produce fully oriented polyester yarns which combine retention of the desired properties, such as high strength, a steep force-elongation diagram and high dyeability, with an enhanced shrinkage capacity of at least 30 (cN/tex)% if the polyester raw material used is a spinnable polyester based on polyethylene terephthalate modified by incorporation of aliphatic dicarboxylic acids as cocondensed units and which may additionally contain up to 5% by weight of further additaments customary for modifying polyethylene terephthalate and wherein the modifying aliphatic dicarboxylic acids have in total from 4 to 10 carbon atoms and are present in such an amount that the glass transition temperature of the polyester is 70° C. or below, the recrystallization temperature of the polyester is 180° C. or below and the heat of fusion of the polyester, determined by DSC measurement, is 30 J/g or below.

The present invention provides such a polyester raw material.

Suitable modifying aliphatic dicarboxylic acid for incorporation in the polyesters of the invention have a total of from 4 to 10 carbon atoms. Examples are glutaric acid, adipic acid, pimelic acid, suberic acid, azelaic acid and sebacic acid. Preference is given to those spinnable polyesters of the invention whose modifying dicarboxylic acid is an aliphatic dicarboxylic acid of from 5 to 8 carbon atoms and in particular to those whose modifying dicarboxylic acid is adipic acid.

In general, the polyester raw material of the invention has the desired properties when the modifying dicarboxylic acid is present in an amount of from 4 to 12% by weight, preferably in an amount of from 5 to 8% by weight, based on the ethylene terephthalate group content of the polyester.

Ethylene terephthalate groups are the main building blocks of the polyester according to the invention and conform to the formula

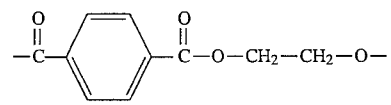

The specific polyester raw material of the invention may contain as customary modifier components, based on the total acid components, from 0.5 to 5.0% by weight of radicals of aromatic dicarboxylic acids whose carbonyl bonds are at an angle or whose aromatic nuclei carry modification-active substituents, and/or, based on the total diol components, from 0.5 to 5.0% by weight of alkane- or cycloalkane-diols of from 3 to 10 carbon atoms, di- or triethylene glycol or polyethylene glycol having a molecular weight of up to 4000.

Aromatic dicarboxylic acids which can be incorporated in the polyesters of the invention as customary modifier components are for example isophthalic acid, sulfoisophthalic acid, methylterephthalic acid, chloroterephthalic acid, methylisophthalic acid, chlorisophthalic acid, 3or 4-carboxyphenyl acetic acid, naphthalene-1,3-, 1,6-, 2,5- or -2,7-dicarboxylic acid. Diols which can be incorporated as modifiers in the polyesters of the invention and to be used according to the invention are for example propanediol, butanediol, pentanediol, dimethylpropanediol, octanediol, isooctanediol, cyclohexanediol, bishydroxymethylcyclohexane, diethylene glycol (=dihydroxydiethyl ether), triethylene glycol (=bis(2-hydroxyethoxy)ethane) and polyethylene glycol or polypropylene glycol having an average molecular weight of up to about 4000. If the polyester raw material of the invention additionally contains customary modifier components, as well as the modifying aliphatic dicarboxylic acids to be used according to the invention, the usual modifying acid component particularly preferred in practice is isophthalic acid, preferably in proportions of 0.5–5% by weight, in particular from 1 to 2.5% by weight. Preferred customary modifying diol components are diethylene glycol, advantageously present in the polyethylene terephthalate in a proportion of from 0.5 to 3% by weight, in particular from 1 to 2% by weight, and, for example, bishydroxymethylcyclohexane, advantageously present in the polyethylene terephthalate in the abovespecified proportions of from 0.5 to 5% by weight, preferably from 1.5 to 3% by weight.

The polyethylene terephthalate may also contain combinations of modifying acid and diol components, for example from 0.5 to 2.5% by weight, preferably from 1 to 2% by weight, of isophthalic acid and from 0.5 to 2.5, preferably from 1 to 2, % by weight of diethylene glycol.

The average molecular weight of the polyester to be used according to the invention corresponds to an intrinsic viscosity, measured in dichloroacetic acid at 25° C., of 0.5–0.9, preferably 0.6–0.7, dl/g.

Particular preference is given to those polyester raw materials of the invention which in addition to the modifying dicarboxylic acids contain customary modifiers only in amounts of below 2% by weight and in particular to those which apart from the modifying dicarboxylic acids contain no further modifiers.

The present invention also provides a fully oriented polyester yarn comprising this polyester raw material and obtainable therefrom by high speed spinning by the process scheme known from DE-A-21 17 659. Like the polyester raw material of the invention, it is modified by the incorporation of aliphatic dicarboxylic acids as cocondensed units, may additionally contain up to 5% by weight of further additaments customary for modifying polyethylene terepthalate, and in it the aliphatic dicarboxylic acid has in total from 4 to 10 carbon atoms, and the amount of modifying dicarboxylic acid is chosen so that the glass transition temperature of the polyester is 70° C. or below, the recrystallization temperature of the polyester is 180° C. or below and the heat of fusion of the polyester, determined by DSC measurement, is 30 J/g or below.

The fully oriented polyester yarn of the invention further has a shrinkage capacity of at least 30 (cN/tex)%. Its shrinkage capacity is preferably from 35 to 45 (cN/tex)%. What is characteristic is that the shrinkage force is raised only relatively insignificantly by the modification according to the invention—remaining within the range from about 2–3 oN/rex—but that the hot air shrinkage rises by about 100%, for example from about 9% to 18%.

In addition to the abovementioned modifiers present in the polymer as cocondensed units, the polyesters and the yarns of the invention may contain customary physical additaments, for example pigments and delusterants. If no specific decorative purposes are to be achieved, however, preference is given to those polyester raw materials and consequent yarns which do not contain such additaments.

The fully oriented polyester yarns of the invention have birefringence values within the range from 120 to $145 \times 10^{-3}$, preferably from 130 to $145 \times 10^{-3}$.

The birefringence of the yarn is determined in a conventional manner by means of a polarizing microscope.

A further characteristic feature of the fully oriented yarn of the invention is its 10% stretch tension. This value indicates the force, per unit linear density, which is necessary at a temperature of 180° C. to extend the yarn by 10% of its original length. This value is a structural parameter of the ready-produced yarn and must not be confused with the stretching tension which arises in the course of drawing partially oriented filaments in the course of producing conventional yarns. The value of the 10% stretch tension is determined in a conventional manner using known equipment for measuring force/elongation.

The fully oriented polyester yarns of the invention have significantly improved dyeability compared with unmodified polyester yarns produced by high speed spinning. This improvement is reflected in the result of color difference measurement. Here color difference is used in the sense of difference in the lightness value L* of the CIELAB color space (DIN 5033 Part 3), measured on a standard dyeing of the fiber material according to the invention and of the comparative material. Advantageously, the measurement is carried out with a HunterLab Tristimulus Colorimeter, which displays this L* value directly.

The standard dyeing necessary for the measurement is prepared as follows: The polyester materials to be compared are made into yarn samples of approximately equal linear density and these yarns are knitted up separately into a hose. The knitted hose is weighed and given one hot rinse in the dyeing machine to remove spin finish. The hose is then dyed with a liquor ratio of from 30:1 to 70:1 in a dyeing liquor containing 0.65% by weight of (R)SAMARON Navy HGS and 0.65% by weight of a dispersant ((R)DISPERSOGEN A), based on the weight of the knitted hose. The dyeing temperatures is raised from 50° C. to 125° C. over 35 min and then maintained at 125° C. for 30 min.

After dyeing, the hose is reduction cleared at 80° C. in a detergent liquor which contains 2 g/l of sodium hyposulfire, thoroughly rinsed with water and dried. The dyed knitted hose thus prepared is measured in the abovementioned HunterLab colorimeter. The reported color difference is simply the difference in scale divisions indicated by this instrument. Since this form of color measurement is a reflectance measurement, a negative color difference indicates a deeper shade, i.e. higher dye uptake, of the measured sample, while the positive value indicates a lower depth of shade, i.e. a lower dye uptake.

The present invention also provides the process for producing a fully oriented polyester yarn by spinning a modified polyester based on polyethylene terephthalate modified by incorporation of aliphatic dicarboxylic acids as cocondensed units and which may additionally contain amounts below 5% by weight of further additaments customary for modifying polyethylene terephthalate, solidifying the spun filaments by cooling, heating the solidified filaments to a temperature above the glass transition temperature, preferably to from 100° to 150° C., withdrawing the filaments at such a high speed that air friction on the filaments brings about their full orientation, and taking up, wherein the modified polyethylene terephthalate contains as cocondensed units modifying aliphatic dicarboxylic acids which have in total from 4 to 10 carbon atoms in an amount such that the glass transition temperature of the polyester is 70° C. or below, the recrystallization temperature of the polyester is 180° C. or below and the heat of fusion of the polyester, determined by DSC measurement, is 30 J/g or below.

Preferably, the process of the invention is carried out with a polyester of the invention whose modifying dicarboxylic acid is an aliphatic dicarboxylic acid having from 5 to 8 carbon atoms, in particular adipic acid.

Preferably, the polyester of the invention which is used in the process of the invention contains a modifying carboxylic acid in an amount of from 4 to 12, in particular in an amount of from 5 to 8, % by weight.

The spinning withdrawal speed used in carrying out the process of the invention is advantageously such as to result in a yarn tractive force, divided by the final linear density, of below 25 cN/50 dtex, preferably below 23 cN/50 dtex, in particular below 20 cN/50 dtex. In general this yarn tractive force is achieved with withdrawal speeds of above 3000 m/min, in particular with withdrawal speeds of from 3500 to 5000 m/min.

The Examples which follow illustrate the invention.

EXAMPLE 1 (Comparison)

A transesterification reactor is charged with 10 kg of dimethyl terephthalate, 6 kg of ethylene glycol and 3 g of manganese acetate×4 $H_2O$ and the mixture is heated with stirring to 140° C. under nitrogen as protective gas. The reaction temperature is raised to 230° C. in the course of 4 hours and the eliminated methanol and the excess ethylene glycol are distilled off. The molten reaction product is then transferred to a polycondensation vessel, admixed with 1 g of $H_3PO_3$ and 6 g of antimony trioxide and stirred at 240°

C. under nitrogen while ethylene glycol is distilled off under a slightly reduced pressure. Then the internal pressure is reduced to 1.3 mbar in the course of one hour while the temperature of the melt is raised from 240° to 270° C. In the course of a further half an hour the temperature is then raised to 280° C. and stirring continued until the melt has a melt viscosity, measured on a sample at 295° C., of 225 Pa.s.

The polyester thus prepared is spun at the spinneret temperature indicated below in the table to form a 20 filament yarn, which is cooled down by air quench and, after passing through a free-fall tube heater 60 mm in internal diameter and 900 mm in length, which is at the temperature indicated in the table, wound up at the speed indicated in the table, the quench and the extrusion rate being set in such a way that the yarn tractive force indicated in the table is obtained downstream of the heater and the final linear density of the 20 filament yarn is 50 dtex.

The properties of the yarn obtained are shown in the table.

EXAMPLE 2 (Comparison)

A polyester is prepared as indicated in Example 1 with the sole difference that the condensation at 280° C. is carried on to a melt viscosity of 262 Pa.s. The properties of the yarn obtained are listed in the table.

EXAMPLE 3 (Invention)

a) A transesterification reactor is charged with 10 kg of dimethyl terephthalate, 715 g of dimethyl adipate (corresponding to 6.0% by weight of adipic acid, based on dimethyl terephthalate), 6.0 kg of ethylene glycol and 5 g of manganese acetate×4 $H_2O$ and the mixture is heated with stirring to 140° C. under nitrogen as protective gas. The reaction temperature is raised at 230° C. in the course of 4 hours and the eliminated methanol and the excess ethylene glycol are distilled off. The molten reaction product is then transferred to a polycondensation vessel, admixed with i g of $H_2PO_3$ and 6 g of antimony trioxide and stirred at 240° C. under nitrogen while ethylene glycol is distilled off under a slightly reduced pressure.

Then the internal pressure is reduced to 1.3 mbar in the course of one hour while the temperature of the melt is raised from 240° to 270° C. In the course of a further half an hour the temperature is then raised to 280° C. and stirring continued until the melt has a melt viscosity, measured on a sample at 295° C., of 174 Pa.s.

b) The same polyester is obtained when the following procedure is adopted:

A transesterification reactor is charged with 10 kg of dimethyl terephthalate, 6.0 kg of ethylene glycol and 5 g of manganese acetate×4 $H_2O$ and the mixture is heated with stirring to 140° C. under nitrogen as protective gas. The reaction temperature is raised to 230° C. in the course of 4 hours and the eliminated methanol is distilled off. When the elimination of methanol has ended, 600 g of adipic acid are stirred into the molten reaction product and then the excess ethylene glycol is distilled off. Then the melt is transferred to a polycondensation vessel, admixed with 1 g of $H_3PO_3$ and 6 g of antimony trioxide and stirred under nitrogen at 240° C. while ethylene glycol is distilled off under a slightly reduced pressure. Then the internal pressure is reduced to 1.3 mbar in the course of one hour while the temperature of the melt is raised from 240° to 270° C. In the course of a further half an hour the temperature is then raised to 280° C. and stirring continued until the melt has a melt viscosity, measured on the sample at 295° C., of 174 Pa.s.

c) The polyester thus prepared is spun at the spinneret temperature indicated below in the table to form a 20 filament yarn, which is cooled down by air quench and, after passing through a free-fall tube heater 60 mm in internal diameter and 900 mm in length which is at the temperature indicated in the table, wound up at the speed indicated in the table, the quench and the extrusion rate being set in such a way that the yarn tractive force indicated in the table is obtained downstream of the heater and the final linear density of the 20 filament yarn is 50 dtex.

The properties of the yarn obtained are shown in the table.

EXAMPLES 4 AND 5

These Examples are carried out in line with Example 3a and 3c, except that in Example 4 the amount of dimethyl adipate is raised from 715 g to 779 g and in Example 5 it is raised to 950 g. The condensation and spinning conditions and the properties of the yarn obtained can be discerned from the table.

EXAMPLE 6

A transesterification reactor is charged with 10 kg of dimethyl terephthalate, 779 g of dimethyl adipate (corresponding to 6.5% by weight of adipic acid, based on dimethyl terephthlate), 6.0 kg of ethylene glycol, 2 g of pentaerythritol and 3 g of manganese acetate×4 $H_2O$ and the mixture is heated with stirring to 140° C. under nitrogen as protective gas. The reaction temperature is raised at 230° C. in the course of 4 hours and the eliminated methanol and the excess ethylene glycol are distilled off. The molten reaction product is then transferred to a polycondensation vessel, admixed with 1 g of $H_2PO_3$ and 6 g of antimony trioxide and stirred at 240° C. under nitrogen while ethylene glycol is distilled off under a slightly reduced pressure. Then the internal pressure is reduced to 1.3 mbar in the course of one hour while the temperature of the melt is raised from 240° to 270° C. In the course of a further half an hour the temperature is then raised to 280° C. and stirring continued until the melt has a melt viscosity, measured on a sample at 295° C., of 169 Pa.s.

The polyester thus prepared is spun at the spinneret temperature indicated below in-the table to form a 20 filament yarn, which is cooled down by air quench and, after passing through a free-fall tube heater 60 mm in internal diameter and 900 mm in length, which is at the temperature indicated in the table, wound up at the speed indicated in the table, the quench and the extrusion rate being set in such a way that the yarn tractive force indicated in the table is obtained downstream of the heater and the final linear density of the 20 filament yarn is 50 dtex.

The properties of the yarn obtained are shown in the table.

EXAMPLE 7

A transesterification reactor is charged with 10 kg of dimethyl terephthalate, 6.0 kg of ethylene glycol and 5 g of manganese acetate×4 $H_2O$ and the mixture is heated with stirring to 140° C. under nitrogen as protective gas. The reaction temperature is raised to 230° C. in the course of 4 hours and the eliminated methanol is distilled off. When the elimination of methanol has ended, 700 g of adipic acid are stirred into the molten reaction product and then the excess ethylene glycol is distilled off. Then the melt is transferred to a polycondensation vessel, admixed with 1 g of $H_3PO_3$ and 6 g of antimony trioxide and stirred under nitrogen at 240° C. while ethylene glycol is distilled off under a slightly reduced pressure. Then the internal pressure is reduced to 1.3 mbar in the course of one hour while the temperature of the melt is raised from 240° to 270° C. In the course of a further half an hour the temperature is then raised to 280° C. and stirring continued until the melt has a melt viscosity, measured on a sample at 295° C., of 138 Pa.s.

The polyester thus prepared is spun at the spinneret temperature indicated below in the table to form a 20 filament yarn, which is cooled down by air quench and, after passing through a free-fall tube heater 60 mm in internal diameter and 900 mm in length, which is at the temperature indicated in the table, wound up at the speed indicated in the table, the quench and the extrusion rate being set in such a way that the yarn tractive force indicated in the table is obtained downstream of the heater and the final linear density of the 20 filament yarn is 50 dtex.

The properties of the yarn obtained are shown in the table.

EXAMPLE 8

The following Example illustrates the preparation of the polyester prepared in Example 3 by direct esterification: An esterification reactor is charged with 8.55 kg of terephthalic acid 600 g of adipic acid and 4.0 kg of ethylene glycol and the mixture is heated with stirring and under nitrogen as protective gas under a pressure of 1.5 bar in such a way that the eliminated water is distilled off. After elimination of the water has ended, the molten reaction product is transferred to a polycondensation vessel, admixed with 1 g of $H_3PO_3$ and 6 g of antimony trioxide and stirred under nitrogen at 240° C. while ethylene glycol is distilled off under a slightly reduced pressure.

Then the internal pressure is reduced to 1.3 mbar in the course of one hour while the temperature of the melt is raised from 240° to 270° C. In the course of a further half an hour the temperature is then raised to 280° C. and stirring continued until the melt has a melt viscosity, measured on a sample at 295° C., of 176 Pa.s.

TABLE

| Process or material feature | Example 1 | Example 2 | Example 3 | Example 4 | Example 5 | Example 6 | Example 7 |
|---|---|---|---|---|---|---|---|
| Additions | none | Diethylene glycol | Adipic acid | Adipic acid | Adipic acid | Adipic acid + pentaery-thritol | Adipic acid |
| Quantities added [% by weight] (*) | | 1.0 | 6.0 | 6.5 | 8.0 | 6.5 + 0.002 | 7.0 |
| Melt viscosity [Pa.s] (at °C.) | 225 (295) | 262 (295) | 174 (285) | 172 (280) | 167 (285) | 169 (280) | 138 (280) |
| Spinneret temp. °C. | 278 | 285 | 276 | 271 | 276 | 271 | 271 |
| Heater temperature °C. | 200 | 200 | 210 | 210 | 210 | 210 | 210 |
| Winding speed [m/min] | 4200 | 4200 | 4600 | 4800 | 4600 | 4800 | 4800 |
| Yarn tractive force downstream of heater [cN] | 20 | 19 | 20 | 22.5 | 20 | 24 | 23 |
| Glass transition temperature [°C.] | 78.5 | 79 | 69 | 61 | 61 | 60 | 59 |
| Recrystallization temperature [°C.] | 182 | 187 | 170 | 170 | 167 | 170 | 168 |
| Heat of fusion [J/g] | 35.8 | 42 | 28 | 28 | 25 | 22 | 27 |
| Breaking strength [cN/tex] | 37.5 | 39 | 38.5 | 39.5 | 38 | 35 | 39 |
| Breaking extension [%] | 44.7 | 41.5 | 45 | 44 | 47 | 49 | 43.5 |
| Extension at 28 cN/tex [%] | 24.5 | 18.5 | 22 | 18 | 23.5 | 29 | 19 |
| 100° C./200° C. shrinkage [%] | 6/9.1 | 6.2/9.8 | 6.5/15.3 | —/16.5 | 7/19 | —/15.5 | —/16.3 |
| Density g/cm³ | 1.3743 | 1.3814 | 1.3695 | 1.3715 | 1.3681 | 1.3712 | 1.3731 |
| Crystallinity [%] | 37 | 42.8 | 33 | 34.7 | 31.8 | 34.5 | 36 |
| 10% stretch tension [cN/tex] | 9.16 | 8.67 | 8.9 | 8.2 | 8.2 | 8.0 | 8.3 |
| Birefringence × 10³ | 140 | 136 | 141 | 131 | 137 | 122 | 133 |
| Shrinkage tension [cN/tex] | 2.15 | 2.0 | 2.2 | 2.65 | 2.2 | 2.6 | 2.75 |
| Shrinkage capacity [(cN/tex)%] | 19.56 | 19.6 | 33.66 | 43.7 | 41.8 | 40.3 | 44.8 |
| Color difference to Example 1 (Comparison) | — | — | −11 | −12 | −12 | −12 | |

(*) Quantities added, based on dimethyl terephthalate.
The data of the above table are directly comparable with one another, since the spinning conditions of jet temperature, heater temperature, winding speed and yarn tractive force are optimized to the material, i.e. adjusted in such a way that the best filament data was obtained for the respective polyester material.

What is claimed is:

1. A spinnable modified polyester for producing fully-oriented polyester yarn by high-speed spinning comprising:
   polyethylene terephthalate; and
   aliphatic dicarboxylic acids as cocondensed units,
   wherein the aliphatic dicarboxylic acids present as cocondensed units have in total from 4 to 10 carbon atoms; and
   wherein the aliphatic dicarboxylic acids are present in an amount sufficient to provide a glass transition temperature of the polyester is] of up to 70° C., recrystallization temperature of the polyester of up to 180° C., and a heat of fusion of the polyester, determined by DSC measurement, of up to 30 J/g.

2. The spinnable polyester of claim 1, wherein the modifying dicarboxylic acid is an aliphatic dicarboxylic acid having from 5 to 8 carbon atoms.

3. The spinnable polyester of claims 1, wherein the modifying dicarboxylic acid is adipic acid.

4. The spinnable polyester of claim 1, wherein the modifying dicarboxylic acid is present in an amount of from 4 to 12% by weight.

5. The spinnable polyester of claim 1, wherein the modifying dicarboxylic acid is present in an amount of from 5 to 8% by weight.

6. A polyester as claimed in claim 1, further comprising 5% by weight of modifiers.

* * * * *

UNITED STATES PATENT AND TRADEMARK OFFICE
CERTIFICATE OF CORRECTION

PATENT NO. : 5,464,694
DATED : NOVEMBER 7, 1995
INVENTOR(S) : BERND HEINRICH

It is certified that error appears in the above-indentified patent and that said Letters Patent is hereby corrected as shown below:

Column 3, line 28, "oN/rex" should read -- cN/tex --.

Column 5, line 37, "i" should read -- 1 --.

Signed and Sealed this

Twentieth Day of February, 1996

Attest:

BRUCE LEHMAN

*Attesting Officer*    *Commissioner of Patents and Trademarks*